Figure 1:
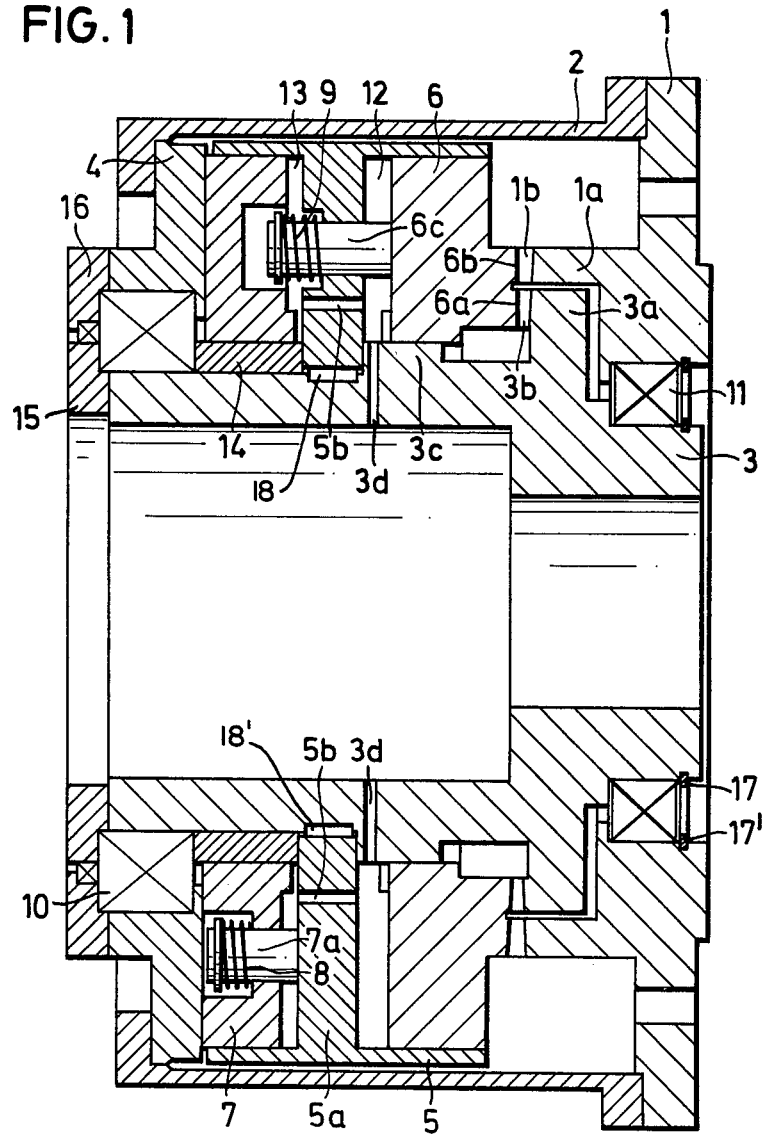

United States Patent [19]

Lunke et al.

[11] 4,245,729

[45] Jan. 20, 1981

[54] SAFETY SHAFT COUPLING

[75] Inventors: Manfred Lunke, Dortmund-Huckarde; Jürgen Walter, Haltern-Hullern, both of Fed. Rep. of Germany

[73] Assignee: Vulkan Kupplungs-und Getriebebau Bernhard Hackforth GmbH & Co. KG, Herne, Fed. Rep. of Germany

[21] Appl. No.: 900,099

[22] Filed: Apr. 26, 1978

[30] Foreign Application Priority Data

May 7, 1977 [DE] Fed. Rep. of Germany ....... 2720679

[51] Int. Cl.$^2$ ...................... F16D 43/21; F16D 19/00
[52] U.S. Cl. ................................ 192/56 F; 192/85 A
[58] Field of Search ............................ 192/56 F, 85 A

[56] References Cited

U.S. PATENT DOCUMENTS

| 2,428,336 | 9/1947 | Munschauer | 192/85 A |
| 3,298,488 | 1/1967 | McDonald | 192/56 F |
| 3,807,539 | 4/1974 | Reed | 192/56 F |

*Primary Examiner*—George H. Krizmanich
*Attorney, Agent, or Firm*—Toren, McGeady and Stanger

[57] ABSTRACT

A safety shaft coupling member for coupling together two coaxial shafts and incorporating an overload safety device, which causes complete interruption of the transmission of torque when an acceptable maximum torque is exceeded, comprises a hub sleeve which is adapted to be fixed to a driven shaft, and a cup-shaped assembly in which the hub sleeve is freely rotatably mounted and is capable of limited axial displacement. The hub sleeve and the cup-shaped assembly have concentric toothed end faces situated in a common plane extending normal to the axis of rotation of the coupling member, and a first annular piston has two annular sets of teeth arranged to mesh with the toothed end faces. This first annular piston is extensible against the force of a restoring spring out of a liquid pressure device which is fixed either to the sleeve or to the cup-shaped assembly, and a second annular piston is also extensible against the force of a restoring spring in a direction opposite to that of the first annular piston out of the liquid pressure device to press against an end face of the cup-shaped assembly or the sleeve, whichever does not have the liquid pressure device fixed to it. Extension of both the pistons engages the teeth of the first piston to the two toothed end faces and so transmits torque from the hub sleeve to the cup-shaped assembly, but release of the liquid pressure in the device causes the first piston to be retracted and interrupt the transmission of torque.

6 Claims, 2 Drawing Figures

SAFETY SHAFT COUPLING

This invention relates to shaft coupling members which are provided with overload safety devices and are known as safety shaft coupling members. In existing safety shaft coupling members, in order to ensure the safety of the shafts which are connected together by the couplings and of the machines and machine components fixed to the shafts, fracturable or rupturable devices or blocking devices capable of being disengaged against the action of springs are provided, or the couplings are constructed as slip couplings. These overload safety devices are expensive in construction and space-consuming. Further, exact adaptation of the coupling member to the maximum torque to be transmitted is difficult, and with the exception of particularly expensive electrically actuated coupling members, none of these safety devices permit an arbitrary interruption of the torque transmission. The replacement of destroyed fracturable or rupturable devices moreover necessitates long shutdowns, and disengageable devices and also slip couplings are subjected to heavy wear after they have responded to an excessive torque. What is more, all these couplings call for accurate axial alignment of the shafts which are to be connected together.

The aim of the present invention is so to construct the overload protection device in a safety shaft coupling member that, while being simple in construction and occupying little additional space, the device reacts to a torque impulse triggered arbitrarily or under operating conditions and completely interrupts the transmission of any torque. This is unlike slip couplings or couplings incorporating blocking devices. The invention is also applicable to safety shaft coupling members in which rigid coupling members, which are fixed to the shafts which are to be coupled, are themselves connected together by members which are resilient in all directions.

To this end, according to this invention, a safety shaft coupling member incorporating an overload safety device, which causes complete interruption of the transmission of torque when an acceptable maximum torque is exceeded, comprises a hub sleeve which is adapted to be fixed to a driven shaft, a cup-shaped assembly in which the hub sleeve is freely rotatably mounted and is capable of limited axial displacement, the hub sleeve and the cu-shaped assembly having concentric toothed end faces situated in a common plane extending normal to the axis of rotation of the coupling member, a first annular piston having two annular sets of teeth arranged to mesh with the toothed end faces, the first annular piston being extensible against the force of a restoring spring out of a liquid pressure device which is fixed to the sleeve or to the cup-shaped assembly, and a second annular piston which is also extensible against the force of a restoring spring in a direction opposite to that of the first annular piston out of the liquid pressure device to press against an end face of the cup-shaped assembly or the sleeve, whichever does not have the liquid pressure device fixed to it.

With this coupling member the interruption of the torque transmission is not directly effected by exceeding the maximum permissible torque, but instead results from arbitrary or automatic operation of the liquid pressure device which may be triggered by the occurrence of an excessive torque without the destruction of coupling parts and without any risk of damage of parts still remaining in mutual contact after the torque transmission has been interrupted.

In order to produce the torsionally locked connection necessary for transmitting torque through the coupling member between the hub sleeve and the cup-shaped assembly (an operation that can only be done initially with the coupling member vertical), it is necessary for both pistons to be extended out of the liquid pressure device since otherwise the first piston which has the sets of teeth can not be brought firmly into engagement with the sets of teeth with which they have to mesh because of the axial play in the bearings connecting the two parts together. The second piston, when extended against an end face of the part of the coupling member which does not carry the liquid pressure device, prevents an undesired, and in certain circumstances dangerous transmission of the axial bearing play to the tooth engagement. For this purpose the second piston pulls the set of teeth of the said part of the coupling member firmly against the set of teeth of the first piston.

The two parts, that is the hub sleeve and the cup-shaped assembly of the coupling member, when torsionally locked together in this manner can, if necessary, be instantaneously separated from one another by opening a valve which contains the pressurised liquid in the liquid pressure device. The opening of the valve releases the connection because the force stored in the restoring spring of the first piston disengages the teeth of this piston axially from the corresponding sets of teeth with which they mesh.

This disengagement can be assisted by making the slope of the flanks of the teeth which transmit the torque such that sliding of the meshing flanks over one another under the effect of the torque applies an axial force in the same direction as the restoring spring. In couplings which must transmit torque in the both directions, this disengagement is achieved independently of the direction of rotation by making the slope of both flanks of all teeth the same. The flank angles and the liquid pressure must be so adapted to one another and to the torque to be transmitted that the liquid pressure cannot be overcome by the axial thrust produced by the maximum torque to be transmitted.

Figure 2:
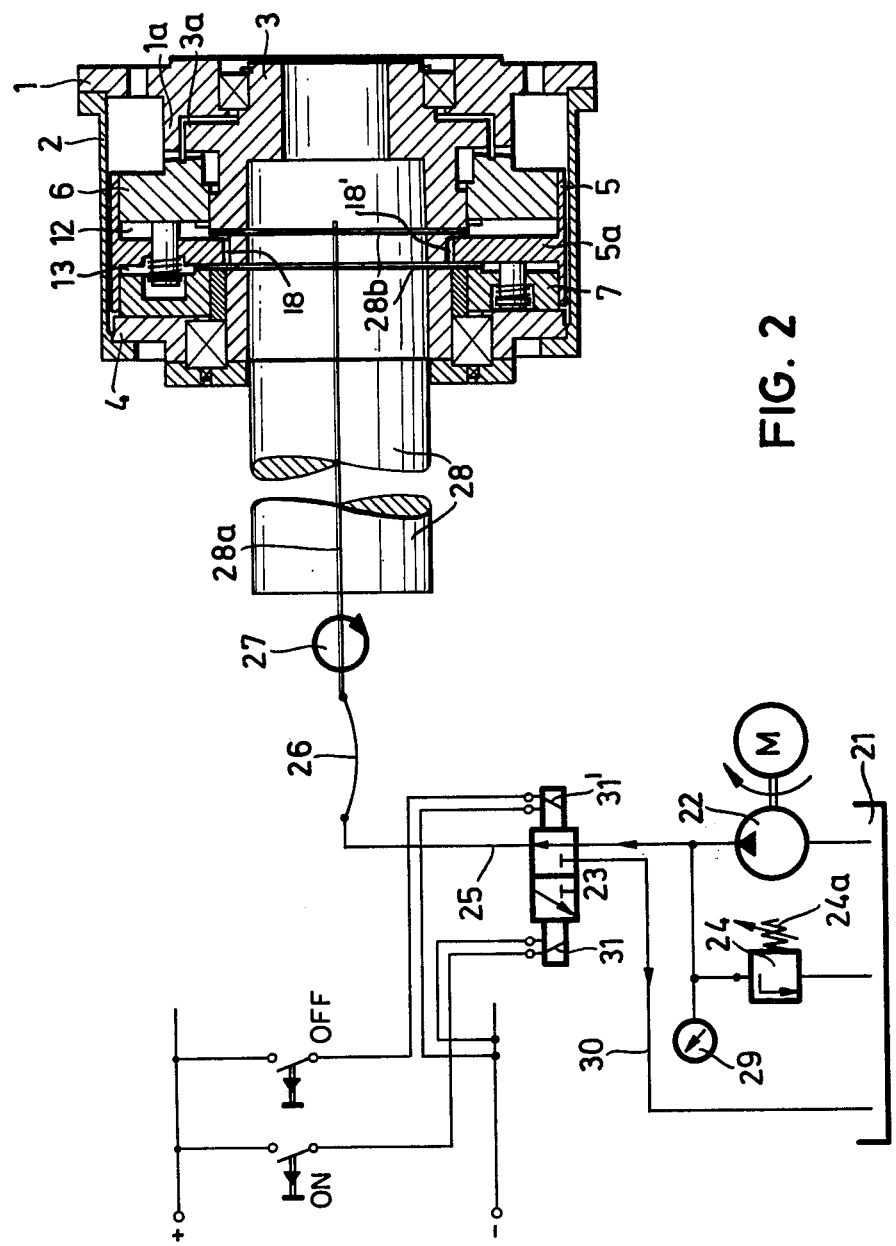

An example of a safety shaft coupling member in accordance with the invention will now be described with reference to the accompanying drawings, in which:

FIG. 1 is an axial section through the member which, in use, is fixed to one shaft and is also, in use, fixed to a second coupling member which in turn is fixed to a second shaft; and, FIG. 2 is a section generally similar to FIG. 1 but to a smaller scale and showing diagrammatically also a power drive for the liquid pressure device of the coupling member with a control associated with the pressure device.

The coupling member shown in FIGS. 1 and 2 has a flange 1 which, in use, is bolted to a second coupling member, which is not shown but is driven by a prime mover. The first coupling member contains an overload safety device and comprises, as shown in FIG. 1, two main components, namely a hub sleeve 3 which, in use, is fixed on a driven shaft, and the flange 1 together with a cylindrical ring 2 and an inner flange ring 4 attached thereto to form a cup-shaped rigid assembly. The hub sleeve 3 is freely rotatably mounted inside the assembly 1, 2, 4 by roller bearings 10 and 11. In the bearing 10, the inner bearing ring is clamped by a cover ring 15 to the hub sleeve 3 and the outer bearing ring is clamped by a cover ring 16 to the cup-shaped assembly 1, 2, 4. The outer and inner bearing rings of the bearing 11 are held in contact by circlips with the end faces of the flange 1 and of the hub sleeve 3 respectively.

The end face of an outer flange 3a of the hub sleeve 3 and the end face of a cylindrical land 1a of the flange 1 which are concentric and lie in the same plane, each have a spur gear 3b, 1b respectively. Axially aligned with the annular spur gears 3b and 1b is the outer end face of an axially movable piston 6. This end face has two annular spur gears 6a and 6b. The teeth of the gear 6a can be brought into engagement with the teeth of the gear 3b and the teeth of the gear 6b can be brought into engagement with the teeth of the gear 1b. The piston 6 forms a part of a hydraulic pressure device comprising two cylinders 12 and 13 and a second annular piston 7, the device being mounted, in this example, on the outside of the hub component 3. The cylinders 12 and 13 are separated by a radial dividing wall 5a, carrying at its radially outer end a cylindrical ring 5 which forms the outer wall of the annular cylinders 12 and 13. The cylinder 12 is bounded on the inner side by an annular shoulder 3c of the hub sleeve 3, and the inner wall of the cylinder 13 consists of a cylindrical ring 14 fixed on the hub sleeve 3. The ring 14 clamps the dividing wall 5a, which separates the cylinders 12 and 13, against the annular shoulder 3c and thus fixes it to the hub sleeve 3. Keys 18, 18' also secure the dividing wall 5a against rotation relative to the hub sleeve 3.

In order that the teeth of the spur gear 6a shall mesh between the teeth of the spur gear 3b when the piston 6 is extended, the piston 6 is additionally guided by axially extending pins 6c which slide in bores in the dividing wall 5a, thus making rotation of the piston 6 relative to the hub sleeve 3 impossible. Heads of the pins 6c which project beyond the dividing wall 5a also serve for supporting pre-compressed compression springs 9, which tend to retract the piston 6 into the cylinder 12 and to bias the piston 6 out of engagement with the spur gears 1b and 3b.

In a similar manner the piston 7 is guided on pins 7a secured to the dividing wall 5a. The pins 7a however serve only for supporting restoring springs 8. When extended, the piston 7, acting through the rings 4 and 2 and the flange 1, pulls the spur gear 1b firmly against the spur gear 6b of the extended piston 6.

In order to produce the torsionally locked connection between the hub sleeve 3 and the assembly 1, 2, 4 necessary for normal operation of the coupling, the cylinders 12 and 13 are filled, while the coupling member is vertical with a liquid which is, of course, incompressible. Since the teeth of the outer spur gear 6b may not or not completely engage with the teeth of the spur gear 1b, the hub sleeve 3 and the cup-shaped assembly 1, 2, 4 must be rotated slightly relative to one another, until all the teeth have come into engagement to their full depth. For small couplings this can be done by hand. For larger couplings, an auxiliary drive (not shown) acting on the flange 1 is with advantage provided. This drive rotates the flange 1 slowly relative to the hub sleeve 3 and the piston 6 while the cylinders are being filled with liquid.

These procedures can be carried out especially simply with a resilient shaft coupling, in which the flange 1 is fixed to the second coupling member (not shown) by an elastic coupling member capable of deformation both rotationally and axially. After the coupling members have been correctly aligned and the cylinders have been filled with liquid, all the rows of teeth should engage one another in pairs without any clearance.

The cylinders 12 and 13 can be connected as desired to a source of pressurised liquid or an unpressurised liquid container, through radial bores 3d in the hub sleeve 3 and axial bores 5b in the dividing wall 5a in a conventional manner through a common line and multiway valve. A delayed extension of the piston 7 can be attained by constructing the bores 5b, which connect the cylinders 12 and 13 together, as throttling ducts or by providing the bores with throttling devices.

It is also possible to connect each of the cylinders 12 and 13 separately to the pressurised liquid line. The pressure liquid exchange takes place in a known manner through an axial bore in a shaft inserted into the hub sleeve 3 and through at least one radial connecting duct in the shaft and a duct 3d in the hub sleeve 3.

To relieve the pistons 6 and 7 from the liquid pressure, the multi-way valve is changed over or a venting valve is opened. This may be done by remote control arbitrarily or automatically in the event of an excessive torque being applied to the coupling as evidenced by excessive relative rotation, for example, between coupling members which are connected together by elastic devices or between the shafts which are connected together by the coupling.

FIG. 2 shows an example of a liquid pressure system, which does not itself form part of the invention for the coupling member shown in FIG. 1, including connections to the cylinders 12 and 13 and the associated valves.

The coupling member of FIG. 2 is slightly different from that of FIG. 1 in that each of the cylinders 12 and 13 is connected to the liquid pressure source and the bores 5b in the dividing wall 5a are not provided.

The liquid pressure source comprises a storage vessel 21 for the liquid, a pump 22 which is continuously driven by a motor M, a mult-way slide valve 23, and a pressure relief valve 24 connecting the delivery side of the pump 22 to the storage vessel 21. The slide valve 23 is connected via a rigid line 25, a flexible line 26 and a slip ring seal 27 to an axial duct 28a in a shaft 28, from which radial branch ducts 28b lead to the radial bores 3d of the hub sleeve 3.

The closure force of the pressure relief valve 24 can be adjusted by means of a spring 24a of variable stress to a value which is indicated by a pressure gauge 29.

The slide valve 23, in the position shown, connects the delivery side of the pump 22 to the line 25 and blocks a line 30 leading from the valve 23 to the storage vessel 21. If the slide of the valve 23 is displaced towards the right, the valve 23 connects the line 25 with the line 30 leading to the storage vessel 21, while it blocks the line 25 from the delivery side of the pump 22. Operation of the slide valve 23 is effected by two solenoid locking relays 31 and 31', which react to direct current pulses triggered by pressure contacts "on" or "off". The pressure contacts are actuated by a control system in dependence upon the torque being transmitted through the coupling and the coupling is released if the torque becomes excessive. The pressure contacts may also be controlled by an override to provide arbitrary release of the coupling.

We claim:

1. In a safety shaft coupling member of the kind which incorporates an overload safety device which causes complete interruption of the transmission of torque when an acceptable maximum torque is exceeded, the improvement wherein said coupling member comprises a hub sleeve, means for fixing said hub sleeve to a driven shaft, a cup-shaped assembly, means for fixing said cup-shaped assembly to a driving member, means mounting said hub sleeve in said cup-shaped assembly for free rotation and limited axial displacement therein, a first toothed end face on said hub sleeve, a second toothed end face on said cup-shaped assembly, said first and second toothed end faces being concentric and situated in a common plane extending normal to the axis of rotation of said coupling member, a first annular piston, first and second annular sets of teeth on said first piston, said first set of annular teeth being arranged to mesh with said first end face and said second annular set of teeth being arranged to mesh with said second toothed end face, a liquid pressure device, means mounting said first annular piston in said liquid pressure device, means for extending said first annular piston from said liquid pressure device, a first restoring spring means resisting extension of said first annular piston, means mounting said liquid pressure device to said hub sleeve or to said cup-shaped assembly, a second annular piston, means mounting said second annular piston in said liquid pressure device, means for extending said second annular piston from said liquid pressure device in a direction opposite to the extension of said first annular piston from said liquid pressure device, a second restoring spring means resisting extension of said second annular piston and means defining an end face on said cup-shaped assembly or said sleeve, whichever does not have said liquid pressure device mounted to it, said second annular piston being adapted to press against said end face when said second annular piston is extended from said liquid pressure device.

2. A safety shaft coupling member as claimed in claim 1, wherein said liquid pressure device includes first and second annular cylinders, and a dividing wall separating said first annular cylinder from said second annular cylinder, a cylindrical ring defining a common outer wall of said first annular cylinder and said second annular cylinder, means fixing said cylindrical ring to said dividing wall, an outer annular shoulder on said hub sleeve defining an inner wall of said first annular cylinder, a cylindrical ring, means fixing said cylindrical ring on said hub sleeve, said cylindrical ring defining an inner wall of said second annular cylinder, and an annular shoulder on said hub sleeve, said dividing wall being clamped between said cylindrical ring and said annular shoulder on said hub sleeve whereby said dividing wall is fixed on said hub sleeve.

3. A safety shaft coupling member as claimed in claim 2, further comprising axially extending pins fixed to said first annular piston, and means defining bores in said dividing wall, said axial pins being slidable in said bores to locate said first annular piston angularly such that said teeth of one of said sets of teeth on said first annular piston are aligned with gaps between teeth on said end face with which said teeth of said one of said sets of teeth mesh.

4. A safety shaft coupling member as claimed in claim 3, wherein said first restoring spring means acts between free ends of said pins and said dividing wall.

5. A safety shaft coupling member as claimed in claim 1, further comprising additional axial pins fixed to said dividing wall, means defining bores in said second annular piston, and means defining recesses in said second annular piston at the ends of said bores, said additional pins being slidable in said bores and terminating in said recesses, said second restoring spring means comprising a plurality of springs located one in each of said recesses and surrounding said further axial pins.

6. A safety shaft coupling member as claimed in claim 2, further comprising means defining a pressurised liquid duct communicating with said first annular cylinder, and means defining a throttling opening communicating said second annular cylinder with said first annular cylinder.

* * * * *